United States Patent
Watanabe et al.

(10) Patent No.: US 6,839,956 B2
(45) Date of Patent: Jan. 11, 2005

(54) METHOD FOR ASSEMBLING DISC APPARATUS

(75) Inventors: Keiko Watanabe, Tsuchiura (JP); Tetsuya Hamaguchi, Chiyoda (JP); Takashi Matsuki, Odawara (JP); Shizuo Yamazaki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/933,899

(22) Filed: Aug. 22, 2001

(65) Prior Publication Data

US 2002/0059718 A1 May 23, 2002

(30) Foreign Application Priority Data

Nov. 20, 2000  (JP) .................................... 2000-357610

(51) Int. Cl.[7] ................... G11B 5/127; H04R 31/00
(52) U.S. Cl. .................. 29/603.03; 29/596; 29/729; 29/732; 29/737; 29/757; 29/759; 29/760; 360/98; 360/98.07; 360/98.08
(58) Field of Search ................... 29/603.03, 596, 29/729, 732, 737, 757, 759, 760; 360/98, 98.07, 98.08

(56) References Cited

U.S. PATENT DOCUMENTS

| | | | | |
|---|---|---|---|---|
| 4,683,505 A | * | 7/1987 | Schmidt et al. .......... 360/98.08 |
| 5,572,382 A | * | 11/1996 | Kuno ...................... 360/98.08 |
| 6,178,063 B1 | * | 1/2001 | Wood et al. ............. 360/98.08 |
| 6,421,199 B1 | * | 7/2002 | McKenzie et al. ....... 360/77.04 |

* cited by examiner

Primary Examiner—Carl J. Arbes
Assistant Examiner—Tim Phan
(74) Attorney, Agent, or Firm—Antonelli, Terry, Stout & Kraus, LLP

(57) ABSTRACT

An object of the invention is to provide a method of assembling a disc which can reduce an unbalance of a rotating portion. The method of assembling a disc-like recording medium has a first step of mounting a disc-like recording medium to a disc apparatus in a state capable of moving the disc-like recording medium with respect to a hub of a spindle motor in a direction of a disc radius, a second step of pressing an outer diameter of the disc in a direction of a center axis of the hub by a first flat member so as to bring an inner diameter of the disc into contact with an outer diameter of a rotary axis of the hub, a third step of pressing back the outer diameter of the disc contact with the first flat member and the outer diameter of the disc at an opposite position to the center of the disc in an inverse direction to a pressing direction of the first flat member to a half of an amount of tolerance between the inner diameter of the disc and the outer diameter of the hub, by a second flat member placed substantially in parallel to the first flat member and in an opposite side to the center axis of the hub, and a fourth step of fixing the disc to the spindle motor hub by a clamp member.

13 Claims, 5 Drawing Sheets

METHOD FOR ASSEMBLING DISC APPARATUS

BACKGROUND OF THE INVENTION

1. Field of the Invention

The present invention relates to a disc apparatus, and more particular to a method for assembling a disc-like recording medium in a rotary shaft of a disc apparatus.

2. Description of Prior Art

A disc apparatus, for example, a magnetic disc apparatus is structured such that a magnetic head is floated in a fine gap due to a pneumatic pressure generated by a rotation of a disc so as to read and write a magnetic record.

In recent years, in order to improve a recording density accompanying with a reduction of size and an increase of capacity of the disc apparatus mentioned above, there have been developed a method of improving an accuracy for positioning an information recording/writing head on a track of a recorded information formed on the disc so as to increase a density of the recording track, and a method of reducing a gap between a head and a surface of a disc medium so as to reduce a bit length in a relative moving direction between the head and the disc and increase a density.

In these methods, if the clamped disc assembly does not have a good balance of rotation, a shaft deflection vibration is increased at a time of rotating the disc, whereby an accuracy in a positioning direction is deteriorated. Further, a vibration in a vertical direction due to an unbalance of rotation rounds into a fluctuation of flying height. Accordingly, it is necessary that the disc assembly satisfies the balance of rotation.

As a method for preventing the unbalance of rotation as mentioned above, there has been conventionally proposed various kinds of methods. For example, in Japanese Unexamined Patent Publication No. 10-149616, there is disclosed a magnetic disc apparatus employing a plurality of discs in an overlapping manner, in which the discs are biased at a tolerance between a motor hub and a fixing hole of the discs, whereby a center of gravity of all combined discs is coincided with a center of a spindle motor. In the structure, for example, in the case of two discs, the discs are biased in direct opposition at a tolerance, and in the case of three discs, the discs are biased at 120 degrees.

In the prior art mentioned above, the assembling step is easily executed, however, in accordance with this method, an inner diameter of the disc and a side surface of the hub are in contact with each other at any area on a circumference. In this state, in the case that the hub is deformed due to a heating and cooling operation or an impact application, a non-isotropic deformation is generated in the discs, whereby there is a risk that a deterioration of positioning accuracy rounds into generation.

SUMMARY OF THE INVENTION

An object of the present invention is to provide a method of assembling a disc which can reduce an unbalance of a rotating portion.

In accordance with the invention described in the present specification, a disc apparatus can be assembled so that the unbalance of the rotating portion can be reduced while restricting a deformation of the disc due to a heat history or the like without increasing a required space.

Further, in accordance with the invention described in the present specification, the disc apparatus can be assembled on the basis of a simple assembling method in which a disc medium is centered with respect to a rotary shaft so as to be mounted to a spindle motor.

The object mentioned above can be achieved by a method of assembling a disc-like recording medium comprising:

a first step of mounting a disc-like recording medium to a disc apparatus in a state capable of moving the disc-like recording medium with respect to a hub of a spindle motor in a direction of a disc radius;

a second step of pressing an outer diameter of the disc in a direction of a center axis of the hub by a first flat member so as to bring an inner diameter of the disc into contact with an outer diameter of a rotary axis of the hub;

a third step of pressing back the outer diameter of the disc contact with the first flat member and the outer diameter of the disc at an opposite position to the center of the disc in an inverse direction to a pressing direction of the first flat member to a half of an amount of tolerance between the inner diameter of the disc and the outer diameter of the hub, by a second flat member placed substantially in parallel to the first flat member and in an opposite side to the center axis of the hub; and a fourth step of fixing the disc to the spindle motor hub by a clamp member.

Further, the object can be achieved by a method of assembling a disc-like recording medium comprising:

a first step of mounting a disc-like recording medium to a disc apparatus in a state capable of moving the disc-like recording medium with respect to a hub of a spindle motor in a direction of a disc radius;

a second step of pressing an outer diameter of the disc in a direction of a center axis of the hub by a first flat member so as to bring an inner diameter of the disc into contact with an outer diameter of a rotary axis of the hub;

a third step of pressing back the outer diameter of the disc contact with the first flat member and the outer diameter of the disc at an opposite position to the center of the disc in an inverse direction to a pressing direction of the first flat member by a second flat member placed substantially in parallel to the first flat member and in an opposite side to the center axis of the hub until the outer diameter of the hub and the inner diameter of the disc are in contact with each other, and measuring an amount of pressing back, that is, a difference between the outer diameter of the hub and the inner diameter of the disc;

a fourth step of pressing back a half of the difference between the outer diameter of the hub and the inner diameter of the disc by the first flat member; and a fifth step of fixing the disc to the spindle motor hub by a clamp member.

The structure may be made such that a pressurizing means for pressing the disc toward the center axis of the hub is provided in a portion to which the first flat member is mounted.

Further, the object can be achieved by a method of assembling a disc-like recording medium comprising:

a first step of fixing a magnetic disc apparatus base on which a spindle motor is mounted;

a second step of mounting a disc-like recording medium to a disc apparatus in a state capable of moving the disc-like recording medium with respect to a hub of a spindle motor in a direction of a disc radius;

a third step of pressing an outer diameter of the disc in a direction of a center axis of the hub by a first flat member so as to bring an inner diameter of the disc into contact with an outer diameter of a rotary axis of the hub;

a fourth step of pressing back the outer diameter of the disc contact with the first flat member and the outer diameter of the disc at an opposite position to the center of the disc in an inverse direction to a pressing direction of the first flat member to a half of an amount of tolerance between the inner diameter of the disc and the outer diameter of the hub, by a second flat member placed substantially in parallel to the first flat member and in an opposite side to the center axis of the hub; and a fifth step of fixing the disc to the spindle motor hub by a clamp member. In this case, it is possible to add a step of measuring a difference between the outer diameter of the hub and the inner diameter of the disc. Further, a pressurizing means for pressing the disc toward the center axis of the hub can be provided in a portion to which the first flat member is mounted.

The means mentioned above can be applied to a centering operation of a spacer ring employed at a time of assembling a plurality of discs, in addition to the disc-like recording medium.

DESCRIPTION OF THE PREFERRED EMBODIMENTS

A description will be given of embodiments in accordance with the present invention with reference to the accompanying drawings.

Figure 1:
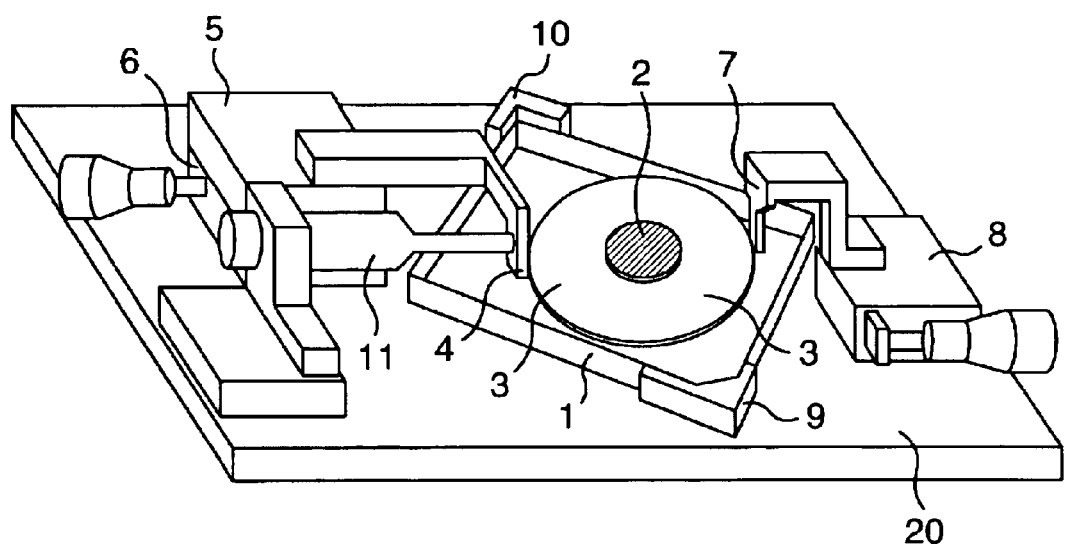
FIG. 1 is a schematic view showing an embodiment of a method of assembling a disc medium in accordance with the present invention.
Figure 2:
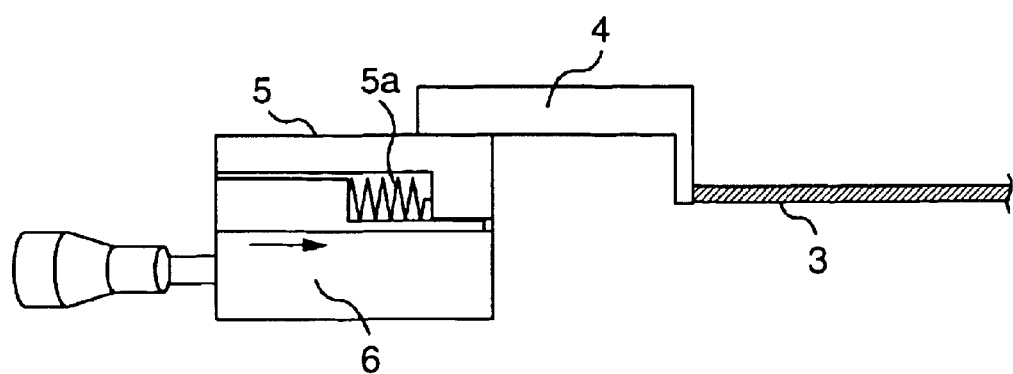
FIG. 2 is a schematic view showing a pressurizing means for pressing a disc in accordance with an embodiment of the present invention.
Figure 3:
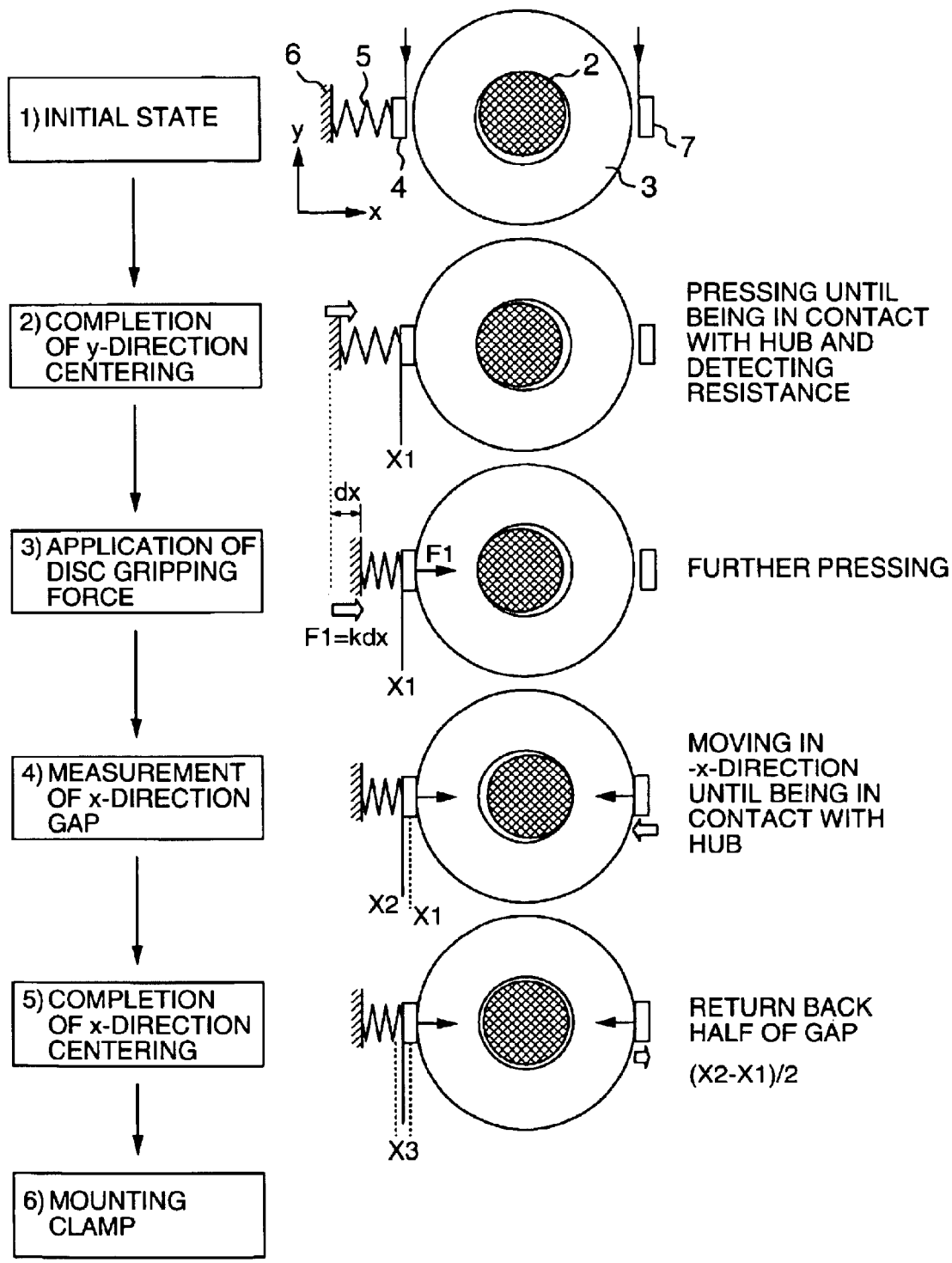
FIG. 3 is a route chart of an embodiment of a method of assembling a disc medium in accordance with the present invention.

FIG. 1 is a schematic view showing an embodiment of a method of assembling a disc medium in a magnetic disc apparatus in accordance with the present invention, FIG. 2 is a schematic view showing an embodiment of a pressurizing means, and FIG. 3 is a schematic view showing a work sequence of an assembling method. The present embodiment shows an example of mounting one disc on a disc apparatus.

A base 1 of a magnetic disc apparatus on which a spindle hub 2 is mounted is rigidly fixed onto a common base 20 of a disc assembling apparatus in accordance with the present invention by jigs 9 and 10. A first flat member 4 and a second flat member 7 which are arranged in a symmetrical manner with respect to a center of the hub 2 are respectively mounted on stages 6 and 8 capable of moving toward a center of the hub, and each of the stages is placed on the common base 20. A pressurizing means 5 constituted by a spring 5a for applying a force pressing a disc 3 toward a center of the hub is placed in the first flat member 4. Further, a displacement gauge 11 is placed for monitoring an amount of displacement of the first flat member 4. A description will be given of an operation of the present embodiment with reference to FIG. 3.

At first, the disc is mounted on the spindle hub. Next, the first flat plate 4 is moved toward the center of the hub while pressing the outer diameter of the disc 3. At this time, the movement is performed until the inner diameter of the disc is in contact with the hub 2 and detects a resistance force. This moving direction is set to an x direction and a direction perpendicular thereto is set to a y direction. At this time, a slip or a rolling is generated at a contact point among the first flat member 4, the second flat member 7 and the outer diameter of the disc 3, and a contact point between the inner diameter of the disc and the outer diameter of the hub. Since a position at which a center of the hub 2 in the y direction coincides with a center of the disc 3 is the most stable point, the centering in the y direction is completed by converging to this position. Thereafter, when moving the stage 6 toward the center of the hub, a spring force of the pressurizing means 5 is applied to the disc 3 which is in contact with the first flat member. In this case, a spring constant of a spring 5a used in this pressurizing means is about 1 N/mm, and a generated force is about 0.5 N to 1 N. In this case, a degree of parallelization of the contact surface between the first flat member 4 and the disc and between the second flat member 7 and the disc is set to be equal to or less than 4 degrees, and a degree of parallelization of the first and second flat members in the moving direction is set to be equal to or less than 1 degree. Further, a coefficient of friction at the contact portion between the first flat member and the outer diameter of the disc and between the second flat member and the outer diameter of the disc is set to be equal to or more than 0.04 and equal to or less than 0.1.

Next, the second flat member 7 in an opposite side is moved in a direction of -x. Accordingly, it is possible to move the disc 3 held in a state of centering in the y direction with respect to the first flat member toward the direction of -x by pressing the outer diameter portion of the disc in an opposite side to the center of the hub. The movement is performed until the inner diameter of the disc in the side of the second flat member 7 is in contact with the hub 2 so as to detect the resistance force. An amount of displacement at this time corresponds to a difference between the outer diameter of the hub and the inner diameter of the disc in the x direction, that is, an amount of gap.

Next, the second flat member 7 is returned at a half of the measured amount of the gap in a moving stage 8 in the side of the second flat member 7. At this moment, the centering in the x direction is completed. It is possible to employ a method of previously calculating an average amount of gap on the basis of a tolerance of the inner diameter of the used discs and a tolerance of the outer diameter of the hub so as to omit the part of measuring the gap mentioned above, and moving the second flat member in the direction of -x at a known amount of gap. In this case, in comparison with the method of determining the position of center by comprehending the amount of gap in each case, a dispersion due to an individual difference is added as a centering error.

In accordance with the present embodiment, there is shown a method of measuring the amount of gap by the displacement gauge 11, however, it is possible to employ a structure substituted by the stages 6 and 8.

Figure 4:
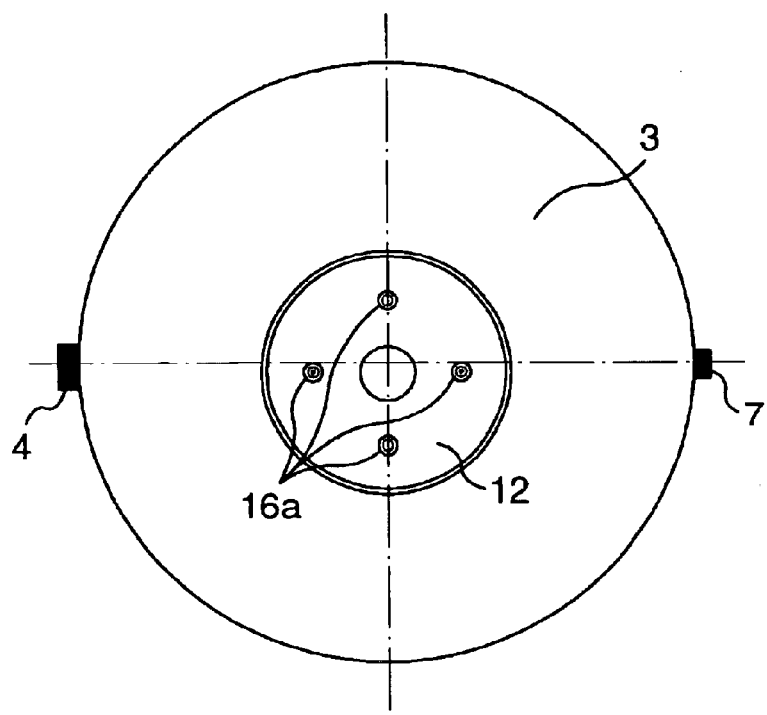
FIG. 4 is a schematic view showing an embodiment of a method of assembling a disc medium in accordance with the present invention.
Figure 5:
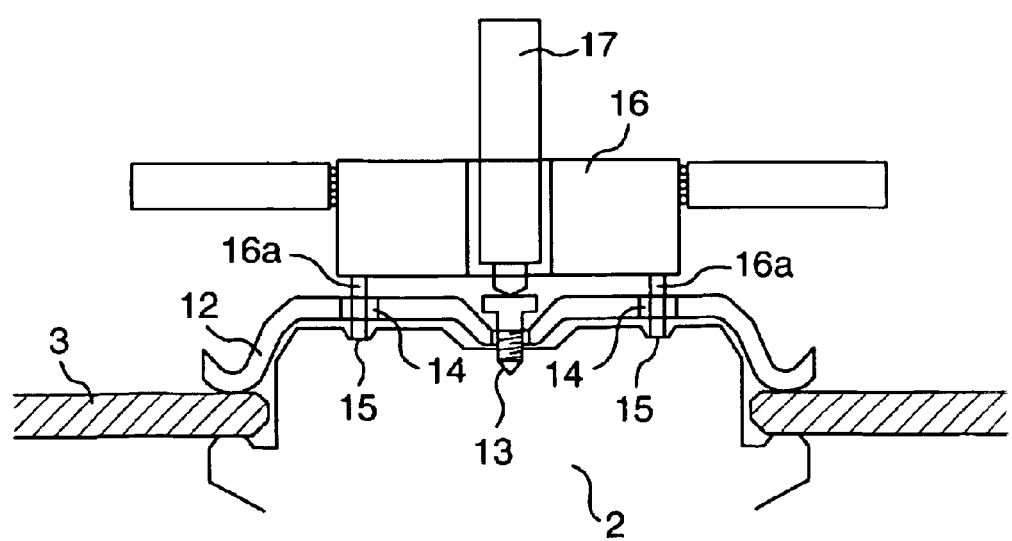
FIG. 5 is a schematic view showing an embodiment of a method of assembling a disc medium in accordance with the present invention.

FIGS. 4 and 5 are schematic views showing a method of fixing the disc medium in a state of being centered by the means mentioned above to the hub by a clamp. A spring force of the clamp 12 is generated by putting the clamp 12 on the disc 3 and the hub 2 and fastening a clamp screw 13 with respect to the hub by a screw driver 17, whereby the disc is fixed to the hub. At a time of fastening the clamp screw, a rotation preventing member 16 for the hub is employed so as to prevent the spindle hub 2 from rotating due to a rotational torque. A rotation preventing pin 16a is placed in the rotation preventing member 16, and it is possible to prevent the hub from rotating by inserting the pin 16a to a groove hole 15 provided on an upper surface of the hub. A hole 14 for passing the pin therethrough is pieced in the clamp 12.

Since the disc 3 is under a state of being centered with respect to the center of the hub, in the case of attaching the rotation preventing member in a state that the center of the rotation preventing member and the center of the hub are shifted, the hub is displaced, and the centering of the disc is deteriorated. In order to make a success of centering and assembling, it is necessary that the hub is not displaced.

Figure 8:
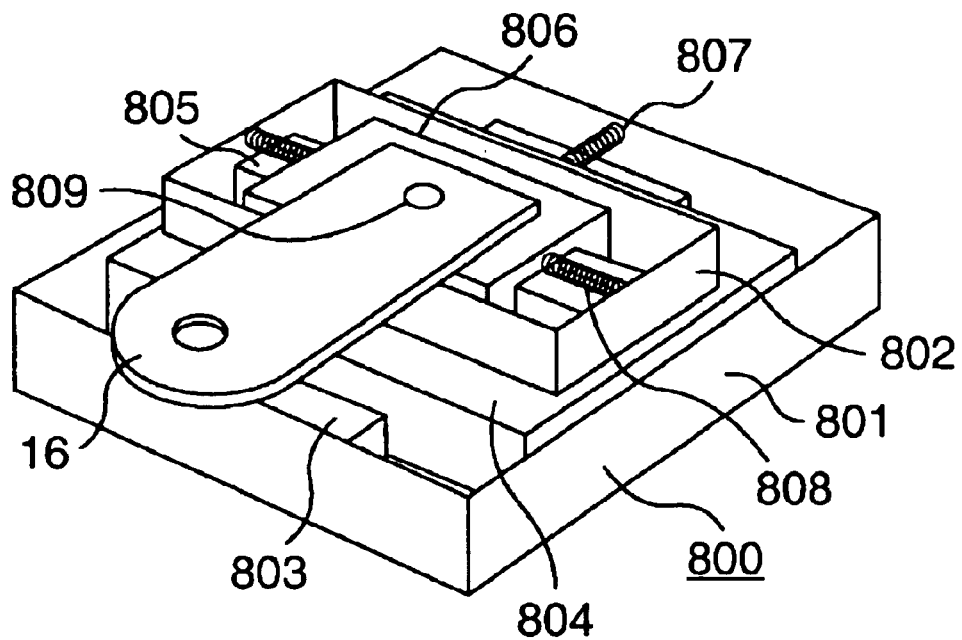
FIG. 8 is a schematic view showing a structure of a disc rotation preventing means employed in a method of assembling a disc medium in accordance with the present invention.
Figure 8:
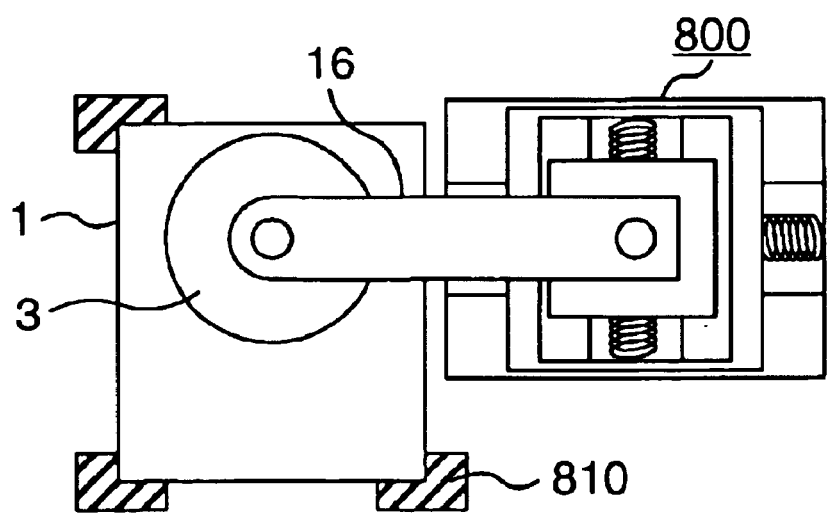

Then, as shown in FIG. 8, the rotation preventing member 16 is set under a soft fixed state within an x-y plane by a rotation preventing apparatus 800. The rotation preventing apparatus 800 shown in FIG. 8A is structured such that the rotation preventing member 16 is supported in a direction of the x-y plane parallel to the disc recording plane and a force for restricting a movement of the member 16 is applied thereto. That is, rails 803 and 805 respectively formed in an x direction and a y direction corresponding to a rotation preventing direction in accordance with the present invention are connected to an x-direction supporting apparatus 801 and a y-direction supporting apparatus 802 respectively provided with movably engaged pedestals 804 and 806. Further, the pedestals 804 and 806 are supported on the x-direction supporting apparatus 801 and the y-direction supporting apparatus 802 by elastic members (for example, springs or the like) applying repulsive force to motions in the x direction and the y direction so as to flexibly restrict the position. Then, the rotation preventing member 16 is bonded to any one of the pedestals 804 and 806 and is fixed by a fixing means 809.

The rotation preventing apparatus 800 is, as shown in FIG. 8B, arranged in a side portion of the disc base 1 a position of which is fixed, moves the rotation preventing member 16 above the clamp 12 mounted on the disc 3 so that the clamp hole 14 coincides with the position of the groove hole 15 on the hub 2, and is adjusted so that the pin 16a is accurately positioned on the hole 14.

In this state, although an illustration is omitted, the pin 16a is fitted to the groove hole 15 by the rotation preventing apparatus 800 or a means for moving the base 2 in a vertical direction. At this time, the rotation preventing member 16 is set under the soft fixed state within the x-y plane by the rotation preventing apparatus 800, and the diameter of the rotation preventing pin 16a is set to a size having a sufficient gap with respect to the groove hole 15 of the hub and the hole 14 of the clamp, whereby the structure is made such that the rotation preventing member 16 is automatically aligned with the hub 2.

Figure 6:
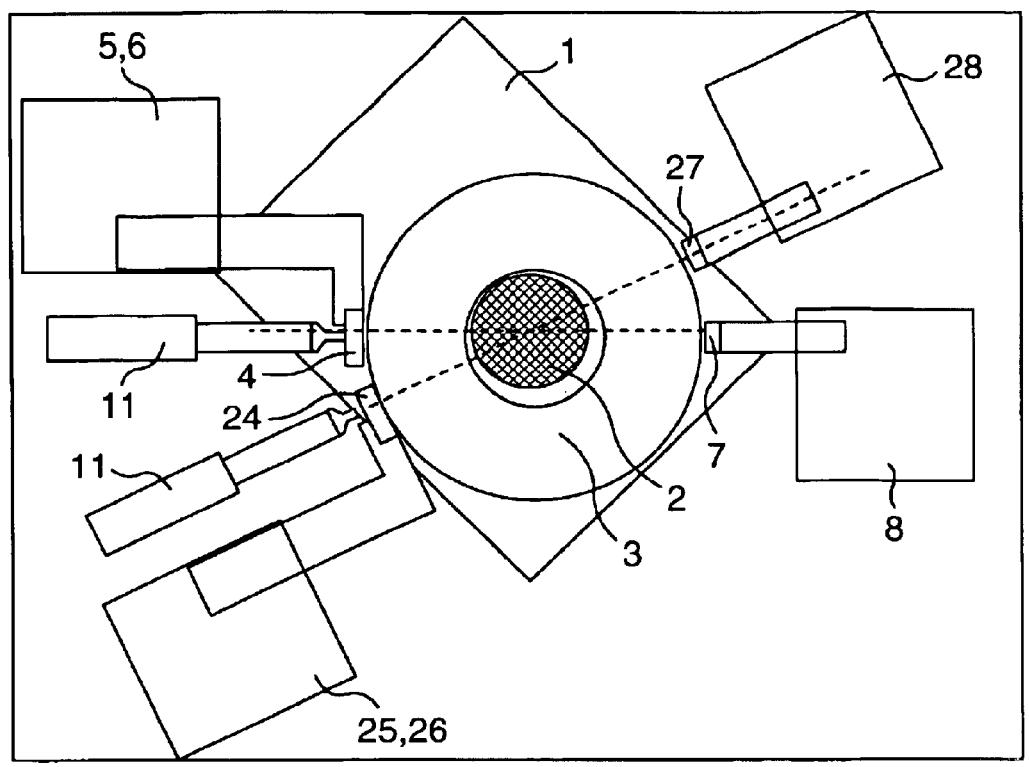
FIG. 6 is a schematic view showing an embodiment of a method of assembling a disc medium in accordance with the present invention.
Figure 7:
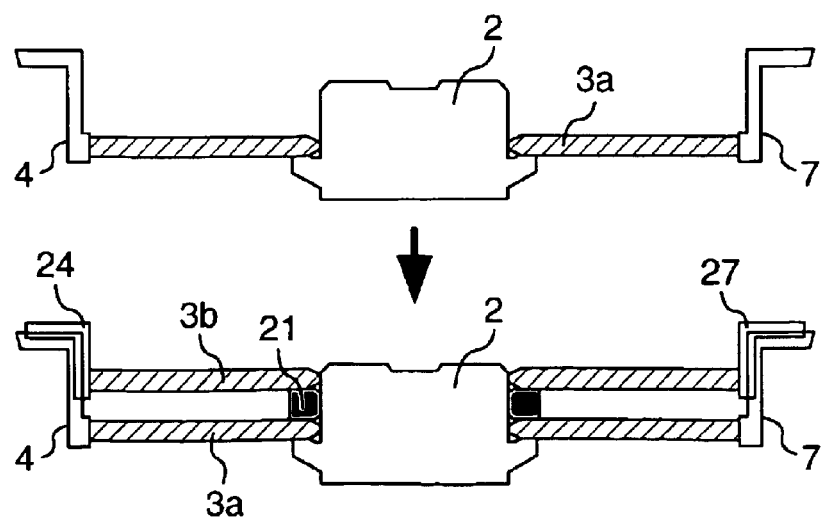
FIG. 7 is a schematic view showing an embodiment of a method of assembling a disc medium in accordance with the present invention.

FIGS. 6 and 7 are schematic views of another embodiment in accordance with the present invention. In the previous embodiment, the structure is made such that one disc is positioned to the hub, however, the present embodiment is structured such that two (a plurality of) discs are mounted on the disc apparatus.

In the present embodiment, the same steps as those of the first embodiment are employed until the magnetic disc mounting the spindle hub 2 is rigidly fixed to the base 1. Next, a lower disc 3a is mounted and is centered by using the flat members 4 and 7. This method is the same as that of the first embodiment. Each of the flat members 4 and 7 used for centering the lower disc is structured such that only a height position portion of the lower disc is formed in a convex shape as shown in FIG. 7 so as to be prevented from being in contact with the upper disc. A spacer 21 and an upper disc 3b are mounted in a state of holding the lower disc 3a by the first and second flat members 4 and 7 used for positioning in a state of centering.

Next, the upper disc 3b is centered by using third and fourth flat members 24 and 27 independent from the first and second flat members 4 and 7 used for centering the lower disc. This method is the same as that of the first embodiment. When the centering is finished, the disc is fixed to the hub by using the clamping method mentioned above. Accordingly, it is possible to center and assemble two discs. In accordance with the method mentioned above, when setting a plurality of discs, a corresponding number of flat members to the number of discs are required. However, in the case that the holding member for holding the set disc is independently provided at a time of setting another disc, one set of flat members are sufficient.

In this case, there is shown a method of centering only the disc medium, however, the centering can be achieved by adding the same structure to the spacer 21. Further, the present embodiment illustrates the case having two discs, however, as previously mentioned, the present embodiment can be applied to an assembly of two or more discs.

In the first and second embodiments, there can be employed a structure made such that in order to keep a friction state of the portion being in contact with the outer diameter of the disc in a fixed state, a front end portion of the flat member can be replaced so as to be replaced after a fixed time use.

In general, in the disc assembling automatic machine used in a process of manufacturing the magnetic disc, it is easy to employ the structure shown in the embodiment mentioned above, an automatic assembling apparatus of the magnetic disc apparatus employing the structure in accordance with the first or second embodiment for the case of being executed in the disc can be listed up as an embodiment.

In accordance with another embodiment of the present invention, it is possible to mount the disc medium to a spindle for a servo track writing (STW) apparatus in the case of a method of writing servo information in advance in place of mounting the disc medium to the magnetic disc apparatus as in the embodiment mentioned above. In this case, it is considered that the spindle is under a fixed state from the start, and there is employed an assembling method except the step of fixing the base in the first and second embodiments.

As mentioned above, in accordance with the present invention, there can be provided a disc assembling method of reducing an unbalance of the rotating portion while restricting the disc deformation due to the heat history or the like without increasing the required space, that is, a simple method of centering the disc medium so as to mount to the spindle motor.

What is claimed is:

1. A method of assembling a disc in a disc apparatus, comprising:

mounting a disc onto a hub of a spindle motor in a disc apparatus in a state capable of being moved with respect to the hub of the spindle motor in a direction of a disc radius;

providing first and second flat members arranged in parallel at opposite sides of the disc mounted on the hub, in a symmetrical manner with respect to a center axis of the hub, the first and second flat members each having a flat surface facing an outer circumferential edge of the disc;

pressing the first flat member having a flat surface toward an outer circumferential edge of the disc in a first direction of a center axis of the hub, so as to bring an inner circumferential edge of the disc into contact with an outer circumferential surface of the hub;

pressing the second flat member having a flat surface toward the outer circumferential edge of the disc in contact with the first flat member and the outer circumferential edge of the disc in second direction opposite to said first direction, to a half of an amount of tolerance between the inner circumferential edge of the disc and the outer circumferential surface of the hub, so as to center the disc with respect to the center axis of the hub in both vertical and horizontal directions; and fixing the disc to the hub of the spindle motor by a clamp member.

2. A method as claimed in claim 1, wherein pressurizing means for pressing the outer circumferential edge of the disc toward the center axis of the hub is provided in a portion to which the first flat member having the flat surface is mounted to press the outer circumferential edge of the disc in the direction of the center axis of the hub.

3. A method as claim in claim 2, wherein said pressurizing means includes a spring arranged to press the first flat member having the flat surface against the outer circumferential edge of the disc toward the center axis of the hub.

4. A method as claim in claim 2, wherein a displacement gauge is provided to monitor the movement of the first flat member as the first flat member having the flat surface is pressed against the outer circumferential edge of the disc toward the center axis of the hub.

5. A method of assembling a disc in a disc apparatus, comprising:

mounting a disc onto a hub of a spindle motor in a disc apparatus in a state capable of being moved with respect to the hub of the spindle motor in a direction of a disc radius;

providing first and second flat members arranged in parallel at opposite sides of the disc mounted on the hub, in a symmetrical manner with respect to a center axis of the hub, the first and second flat members each having a flat surface facing an outer circumferential edge of the disc;

pressing an outer circumferential edge of the disc in a direction of a center axis of the hub by the first flat member having a flat surface, so as to bring an inner circumferential edge of the disc into contact with an outer circumferential surface of the hub;

pressing back the outer circumferential edge of the disc in contact with the first flat member and the outer circumferential edge of the disc at an opposite position to the center of the disc in an inverse direction to a pressing direction of the first flat member by the second flat member having a flat surface, until the outer circumferential surface of the hub and the inner circumferential edge of the disc are in contact with each other, and measuring a difference between the outer circumferential surface of the hub and the inner circumferential edge of the disc;

pressing back a half of the difference between the outer circumferential surface of the hub and the inner circumferential edge of the disc by the first flat member, so as to center the disc with respect to the center axis of the hub in both vertical and horizontal directions; and fixing the disc to the hub of the spindle motor by a clamp member.

6. A method as claimed in claim 5, wherein pressurizing means for pressing the outer circumferential edge of the disc toward the center axis of the hub is provided in a portion to which the first flat member having the flat surface is mounted to press the outer circumferential edge of the disc in the direction of the center axis of the hub.

7. A method as claim in claim 6, wherein said pressurizing means includes a spring arranged to press the first flat member having the flat surface against the outer circumferential edge of the disc toward the center axis of the hub.

8. A method as claim in claim 6, wherein a displacement gauge is provided to monitor the movement of the first flat member as the first flat member having the flat surface is pressed against the outer circumferential edge of the disc toward the center axis of the hub.

9. A method of assembling a disc in a disc apparatus comprising:

fixing a disc apparatus base on which a spindle motor is mounted;

mounting a disc onto a hub of a spindle motor in a disc apparatus in a state capable of being moved with respect to the hub of the spindle motor in a direction of a disc radius;

providing first and second flat members arranged in parallel at opposite sides of the disc mounted on the hub, in a symmetrical manner with respect to a center axis of the hub, the first and second flat members each having a flat surface facing an outer circumferential edge of the disc;

pressing an outer circumferential edge of the disc in a direction of a center axis of the hub by the first flat member having a flat surfaces, so as to bring an inner circumferential edge of the disc into contact with an outer circumferential surface of the hub;

pressing back the outer circumferential edge of the disc in contact with the first fiat member and the outer circumferential edge of the disc at an opposite position to the center of the disc in an inverse direction to a pressing direction of the first flat member to a half of an amount of tolerance between the inner circumferential edge of the disc and the outer circumferential surface of the hub, by the second flat member having a flat surface, so as to center the disc with respect to the center axis of the hub in both vertical and horizontal directions; and fixing the disc to the hub by a clamp member.

10. A method of assembling a disc in a disc apparatus comprising:

fixing a disc apparatus base on which a spindle motor is mounted;

mounting a disc onto a hub of a spindle motor in a disc apparatus in a state capable of being moved with respect to the hub of the spindle motor in a direction of a disc radius;

providing first and second flat members arranged in parallel at opposite sides of the disc mounted on the hub, in a symmetrical manner with respect to a center axis of the hub, the first and second flat members each having a flat surface facing an outer circumferential edge of the disc:

pressing an outer circumferential edge of the disc in a direction of a center axis of the hub by the first flat member having a flat surface, so as to bring an inner circumferential edge of the disc into contact with an outer circumferential surface of the hub;

pressing back the outer circumferential edge of the disc in contact with the first flat member and the outer circumferential edge of the disc at an opposite position to the center of the disc in an inverse direction to a pressing direction of the first flat member by the second flat member having a flat surface, until the outer circumferential surface of the hub and the inner circumferential edge of the disc are in contact with each other, and measuring a difference between the outer circumferential surface of the hub and the inner circumferential edge of the disc corresponding to an amount of pressing back;

pressing back a half of the difference between the outer circumferential surface of the hub and the inner circumferential edge of the disc by the first flat member, so as to center the disc with respect to the center axis of the hub in both vertical and horizontal directions; and fixing the disc to the hub of the spindle motor by a clamp member.

11. A method for controlling a disc apparatus comprising a base on which a spindle motor hub is mounted, and a disc mounted onto the hub, said method comprising:

providing first and second flat members with flat surfaces arranged in parallel at opposite sides of a disc relative to a center axis of the hub, to center the disc relative to a center axis of the hub after the disc is mounted onto the hub; and controlling movement of the first and second flat members to center the disc relative to the center axis of the hub by:

pressing the first flat member having a flat surface on one side of the disc against an outer circumferential edge of the disc in a first direction relative to the center axis of the hubs until an inner circumferential edge of the disc is in contact with an outer circumferential surface of the hub;

pressing the second flat member having a flat surface on the other side of the disc against the outer circumferential edge of the disc in a second direction opposite to said first direction relative to the center axis of the hubs until the inner circumferential edge of the disc is in contact with the outer circumferential surface of the hub;

measuring a distance difference between the inner circumferential edge of the disc and the outer circumferential surface of the hub; and pressing the first flat member having the flat surface against the outer circumferential edge of the disc again in said first direction, until the inner circumferential edge of the disc reaches ½ the distance difference between the inner circumferential edge of the disc and the outer circumferential surface of the hub, so as to center the disc with respect to the center axis of the hub in both vertical and horizontal directions.

12. A method as claimed in claim 11, further comprising:

monitoring the movement of the first flat member as the first flat member having the flat surface is pressed against the outer circumferential edge of the disc toward the center axis of the hub.

13. A method as claimed in claim 11, wherein the first flat member having the flat surface is pressed against the outer circumferential edge of the disc toward the center axis of the hub, via a spring.

* * * * *